March 12, 1946. T. W. MOORE 2,396,593
REGULATING MECHANISM
Filed Aug. 15, 1942 2 Sheets-Sheet 1
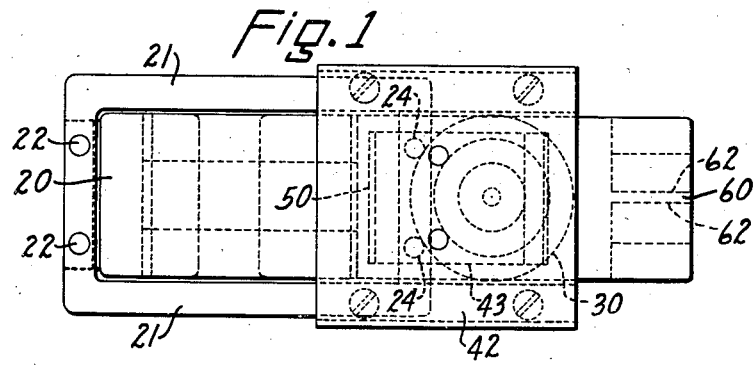
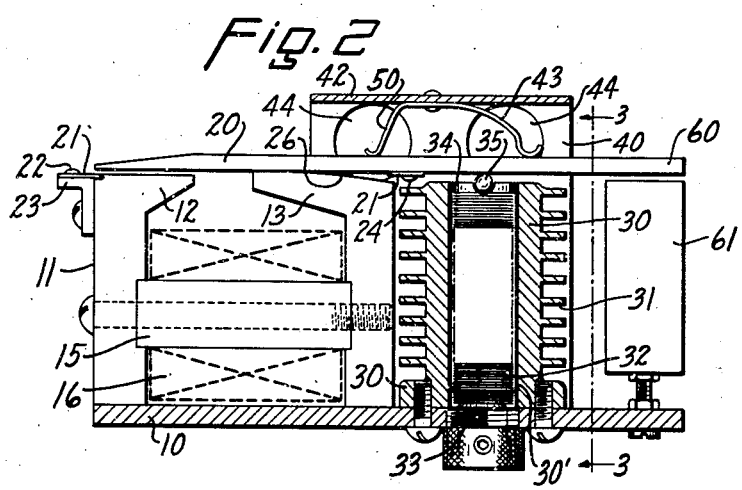
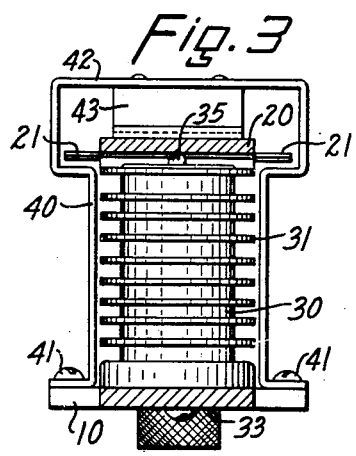
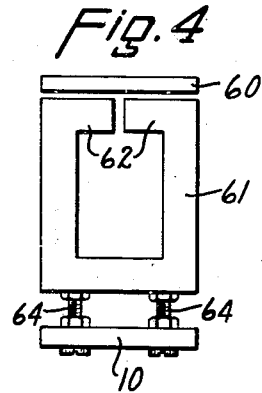
INVENTOR.
Thomas W Moore
BY
Marechal & the March 12, 1946.   T. W. MOORE   2,396,593
REGULATING MECHANISM
Filed Aug. 15, 1942   2 Sheets-Sheet 2
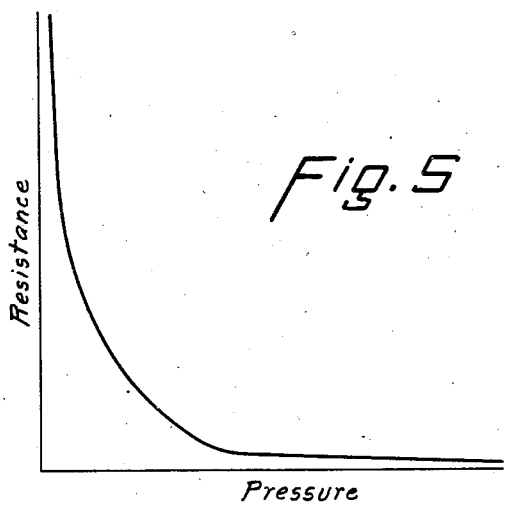
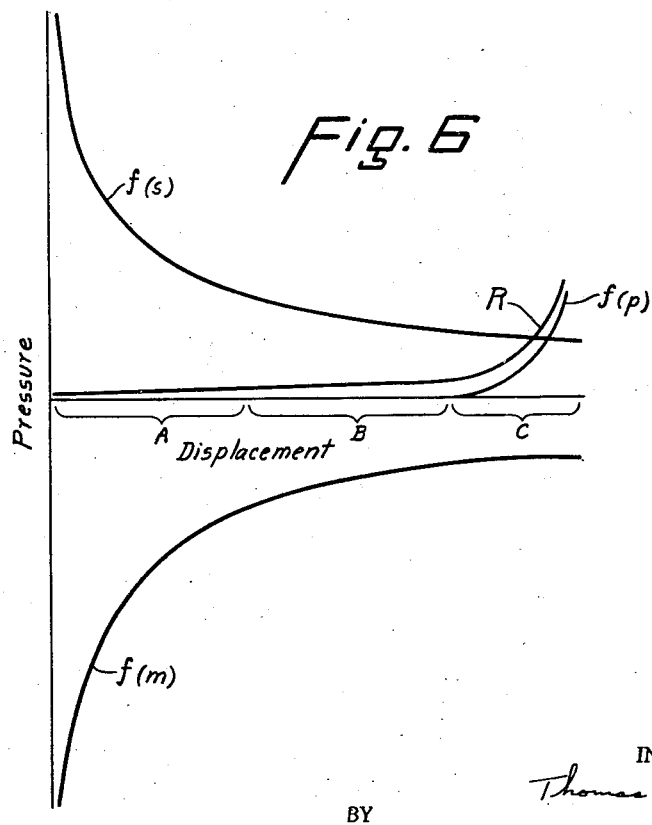
INVENTOR.
Thomas W Moore
BY Marschal & Noe Patented Mar. 12, 1946

2,396,593

UNITED STATES PATENT OFFICE 2,396,593

REGULATING MECHANISM

Thomas W. Moore, Dayton, Ohio, assignor to The Leland Electric Company, Dayton, Ohio, a corporation of Ohio Application August 15, 1942, Serial No. 455,009

10 Claims. (Cl. 201—51)

This invention relates to regulators of the electromagnetic type employing carbon pile resistors.

It is the principal object of the invention to provide an electromagnetic regulator of the carbon pile type which is simple in construction, reliable in operation, and which provides accurate regulation over a wide range.

It is a further object to provide a regulator in which the tractive force of an electromagnet of inherently non-linear characteristics is so applied to the carbon pile that it may balance and closely correspond with the opposing force characteristic of a resilient means.

It is a still further object to provide a regulator of this character having an extended range of operation above and below the normally available resistance range of the carbon pile through the provision of additionally incorporated and properly controlled forces which are maintained in correlated balance throughout the entire range.

Other objects and advantages will be apparent from the following description, the accompanying drawings, and the appended claims.

In the drawings:

Fig. 1 is a top plan view of a regulator device constructed in accordance with the present invention;

Fig. 2 is a view in side elevation thereof;

Fig. 3 is a vertical sectional view on the line 3—3 of Fig. 2;

Fig. 4 is an end elevational view of the auxiliary magnetic means;

Fig. 5 is a diagrammatic showing of the characteristic conditions obtained with a typical carbon pile resistor; and Fig. 6 is also a diagrammatic view representing the operating conditions which occur in the regulator of this invention throughout the range of regulating action.

The tractive force of an electromagnet as is well known inherently varies inversely as the square of the effective air-gap between its poles and armature. While the electromagnetic path may be constructed so that the actual operating characteristic of the electromagnet does not strictly follow a square law curve, it is nevertheless not inherently a linear relation. On the other hand a directly applied spring force inherently has a linear characteristic, and unless properly correlated therewith, it is clear that an electromagnetic force does not follow and correspond with that of a spring throughout any substantial range.

In accordance with the present invention the force developed by the electromagnetic means is not applied directly but is transmitted for application through a variable transmission of suitable construction such that its inherent characteristic is modified and the force as made applicable to the carbon pile either has a linear characteristic, or closely approaches such characteristic over a substantial part of its range. Thus within this range, the force developed by the electromagnetic means and applied through the variable transmission may be balanced against the force of a spring, these two forces being made to correspond so that the resultant thereof may be made use of to control the compression of the carbon pile. Usually it is found desirable to make both opposing forces relatively large in relation to the force actually applied to actuate the carbon pile, and by having such forces relatively large and varying in a corresponding relation, a proper small resultant force is derived which is made use of for the actual control of the carbon pile.

The invention likewise provides for extending the range within which proper correlation of the opposing forces is secured to thereby obtain proper and accurate regulation of the pile over a substantially wide operating range. Thus as the armature of the electromagnetic means approaches its pole pieces, the force developed thereon increases very rapidly, and in cases where improved accuracy over a substantial range is desired an auxiliary spring force is provided which is made effective to oppose and balance this rapid increase of electromagnetic force. Such auxiliary force is not required in the normal or middle part of the range, and the construction suitably provides for rendering such force ineffective where not required but provides for making it available and effective as the adjustment proceeds into that portion of the range of operation where the tractive force on the armature increases toward a maximum.

It is also a characteristic of a carbon pile resistor that the resistance thereof varies from an infinite quantity at no pressure in practically a linear relation with small increments of pressure. Thus a substantially straight line relation occurs as the resistance is brought through the major portion of its operating range and into the lower end of such range. However as the lower end of its range is approached, the pressure required to be applied in order to effect a further reduction in resistance, increases very rapidly. With the ordinary construction of carbon pile regulator, there is no force available of sufficient magnitude to provide this pressure condition required. In accordance with the present invention an auxiliary force is provided and is made effective at the low resistance portion of the range, being substantially ineffective in the remaining part of the range. Preferably this auxiliary force is developed magnetically and it has been found by its use that the operating range of the regulator can be brought into a very desirable low condition range not heretofore readily attainable.

Referring to the drawings which disclose a preferred embodiment of the invention, the regulator assembly is shown comprising a base plate 10 upon which there is mounted an electromagnet indicated generally by reference numeral 11. This magnet comprises pole pieces 12 and 13 which have projections extending toward each other at their upper end as illustrated in Fig. 2 forming an air-gap of proper shape and contour. The core of the magnet is shown at 15 carrying the energizing winding 16 thereon.

The armature is shown at 20 in the form of a flat metal plate overlying pole pieces 12 and 13 and being elongated beyond the pole pieces to serve as a lever for applying the force developed by the magnet. The armature is retained in place through the provision of longitudinally extending spring members 21 which are riveted as shown at 22 to an angle bracket 23 fastened to the upper end of pole piece 12. The opposite end of the springs is riveted to the under side of the armature by means of rivets 24. These springs thus provide for retaining the armature in proper alignment while permitting free pivotal movement thereof toward and away from the pole pieces.

The top portion of pole piece 13 is given a rounded or arcuate contour as indicated at 26. This surface thus serves as a fulcrum for the armature lever, the arcuate construction serving to provide a shifting fulcrum point as the lever pivots about such rounded surface.

At one side of the electromagnet there is positioned the carbon pile resistor. It comprises a cylinder 30 fastened to the base plate 10, the cylinder being finned as shown at 31 to increase the heat radiating capacity thereof. The inner wall of cylinder 30 is suitably insulated electrically from the carbon discs, preferably by means of a ceramic coating 30' or anodizing treatment capable of withstanding the operating temperatures.

Within the cylinder there is positioned a stack of carbon discs 32 which are held in place by means of a bushing 33 threaded into the base thereof. The bushing is provided with a knurled adjusting part which permits of manually raising or lowering the pile and hence adjusting the initial condition of pressure thereon. At the top of the pile there is provided a pressure plate 34 bearing upon the top of the discs, the plate having a central recess within which there is positioned a bearing ball 35 which also engages in a similar recess in the armature lever 20 directly thereabove. This forms a rolling frictional means for transmitting the lever force downwardly onto the carbon pile.

Resilient means are provided to oppose the action of the electromagnet. Such means is located within a frame member 40 which has depending legs fastened to the base plate 10 by means of bolts 41. The frame is bent outwardly to pass around the springs 21 and is formed at its top portion with a central yoke 42. A spring member 43 is suitably fastened to the yoke and bears downwardly on the upper surface of lever 20, apertures 44 being provided in the sides of frame 40 opposite the spring to provide access thereto and for venting purposes. The point of application of the spring force is preferably above or to the right of the ball 35, as illustrated in Fig. 1, being relatively removed from the variable fulcrum 26 described above. Thus since it is relatively remote with respect to the fulcrum and close to the point of application of the force to the pile, it provides for applying such force in a substantially linear manner to the carbon pile, notwithstanding the changes which occur in the effective length of the lever arms as a result of the shifting of the fulcrum.

The tractive force of the electromagnet on the armature lever is applied on the opposite side of the fulcrum 26 and relatively closer thereto. As the armature is drawn downwardly toward the pole pieces, it will be observed that the fulcrum point shifts closer toward the actual line of application of this force. This produces a progressively decreasing length of moment arm of the working force, and it will be equally clear that it results in a progressively increasing length of moment arm through which the force is applied to the pile. Thus the ratio of the two arms changes in a non-linear manner with the result that the actual force applied to the pile through the variable transmission lever is made to approach or approximate a linear condition over a substantial range of operation.

It will thus be seen that the applied spring force and the applied electromagnetic force are made to substantially correspond with each other leaving only the relatively small resultant force represented by the difference to be effective for causing compression of the pile. In operation, where for example the regulator is utilized for control of the voltage of a generator, the energizing winding 16 is supplied with a voltage which is the same as or derived from and variable with the generator voltage. The resistor is suitably connected to provide for control of the generator field. Thus upon an increase of generator voltage, the energization of winding 16 is increased and greater tractive force is applied to the armature. The armature moves toward its pole pieces, against the opposing spring force, and reduces the pressure on the top of the pile, causing the resistance of the pile to increase, reducing the field excitation and hence the generated voltage to substantially the initial value whereupon equilibrium is reestablished. Should the generated voltage continue to rise, a further response of the regulator will take place, the varying lever arm through which the increasing tractive force of the electromagnet is applied providing for maintaining the applied force thereof in substantial balance with the applied force of spring 43, thereby maintaining proper regulation.

As the armature approaches its pole pieces more closely, change in the air-gap path results in a more rapid increase in the tractive force of the magnet and it is thus desirable to provide an additional force for opposing such rapidly increasing tractive force and to thereby maintain the opposing forces in substantial balance over an extended part of the range. As shown, an auxiliary spring 50 is mounted on the yoke 42 and also bears on the top of lever 20 but at a point spaced from spring 43, the line of application of spring 50 being above pole piece 13 and within the range through which the variable fulcrum moves. It will thus be clear that when the armature is in the upper part of its range of movement with respect to the magnet, the fulcrum 26 will be at the right hand part of the top of pole piece 13 (Fig. 2), and the force of spring 50 will either be acting directly downwardly upon the fulcrum or will be acting with such a short moment arm as to be practically ineffective. That is, during the operation of the regulator in the portion of the range where the applied electromagnetic force is balanced by the applied force of spring 43, the force of the auxiliary spring 50 is not required and is rendered ineffective. However as the armature is pulled in closer toward the poles and develops a rapidly increasing attractive force, the auxiliary force of spring 50 is brought into operation and is made to oppose the force of the magnet with an increasing moment arm so as to substantially balance the operation thereof and to provide for extension of the effective range of operation of the regulator into the high end of the resistance range where only a small pressure is applied to the carbon pile.

It is also desirable to provide for extension of the effective operating range of the regulator into the low resistance range thereof. As described above, however, the characteristic of the pile itself is such that a strong and increasing force is required when it is attempted to operate the pile in such low resistance range.

This condition is represented in the characteristic curve shown in Fig. 5. This curve is plotted with resistance as ordinates and pressures applied to the pile as abscissae. From this curve it will be seen that the resistance of the pile decreases rapidly and in a substantially linear manner with small increments in applied pressure such relation continuing throughout the major part of the range. As the low resistance range of the pile is reached, the increments of pressure required to be applied become progressively larger, and additional compressive force is required in order to carry the pile into this portion of its range.

The invention provides for the incorporation of such additional force, the force becoming effective only at the range where it is required to develop the necessary compressing action, and being substantially ineffective over the remainder of the range.

For this purpose the armature lever 20 is provided with an extension 60 which overhangs the end of the carbon pile. Beneath this overhanging end 60 there is positioned a magnetic means 61 which may comprise either an electromagnet or a permanent magnet. Such magnet is so constructed that it has pole pieces 62 which are arranged opposite each other forming a relatively short path for leakage flux. Thus when the armature 60 is spaced above the magnet 61 a distance such that the air-gap between itself and the poles exceeds the length of the leakage path between the poles, the magnet exerts practically no effect upon the armature, leaving it free to respond to the action of the forces described above. This is the condition which exists over the entire upper portion of the resistance range of the pile and thus no added compressive force is applied to the pile. As the armature 60 approaches the magnet pole pieces 62 carrying the pile into the lower end of its range, it comes within the influence of the magnet and a strong force is developed which increases more rapidly than in linear relation. By suitably shaping the contour of the poles of the permanent magnet and the spacing thereof from the armature 60, the force developed thereby may be made to supply the additional pull required to produce compression of the pile to its lower range, and to develop that force only as the regulator moves into the lower end of its range of adjustment. It will be noted that the force of this magnet acts in opposition to the force of the main regulating electromagnet, pulling downward directly against the pile. Also since it is usually not necessary to vary this force, it is found desirable to utilize a permanent magnet rather than an electromagnet. The regulating action is supplied by the operation of the electromagnet 11, as described above, the permanent magnet merely providing the additional force necessary to effect compression of the pile into its low resistance range. As shown the permanent magnet is preferably supported from base plate 10 by suitable adjustable means such as the studs 64 so that its position with respect to armature 60 can be set to make its action effective at the proper point in the travel of the armature as desired.

Referring to Fig. 5 there are shown diagrammatically the various forces which are utilized in securing the desired regulating action. In this figure pressures as applied to the carbon pile are plotted as ordinates with positive pressures being considered as those tending to compress the pile and negative pressures those acting in opposition thereto. Displacements of the pile are plotted as abscissae, the zero position being considered as that in which the armature 20 most closely approaches its pole pieces, applying the minimum pressure to the pile.

The several forces involved will be described as follows: The force of the electromagnet with constant applied voltage as applied through the lever system to the carbon pile is shown as $f(m)$. While this force has a high value at the lower ranges of displacement (where the armature 20 most closely approaches pole pieces 12 and 13), such as in the zone marked A, it will be seen that over the remaining part of the range in the zones marked B and C it is substantially linear. Opposed to this force is the combined effect of the spring forces (43 and 50) as applied through the lever, such force being shown as $f(s)$. In zones B and C it will be noted that this force is also substantially linear and varies generally in the same manner as the corresponding portion of the curve $f(m)$, showing that those forces are substantially balanced. In zone A it will be seen that the applied spring force is increased in a non-linear manner owing to the increasing effect of the auxiliary spring 50 which becomes effective in this range as the fulcrum point of the lever moves out from under the point of application thereof. This spring force is thus made available to oppose and substantially balance the increasing effect of the electromagnet in this range making a substantially balanced condition of forces throughout the entire range.

In zone C, the force of the auxiliary magnet $f(p)$ becomes available and as shown it increases rapidly and in a non-linear manner to provide for overcoming the added resistance necessary to effect compression of the carbon pile as described above.

The resultant R of all of these forces is that pressure which is actually applied to the pile in order to produce compression thereof. It will be seen that there is made available the proper pressure for actuation of the pile throughout the full range from a low resistance condition to a high resistance condition and that such resultant is at all times controlled by the operation of the electromagnet 11. Thus a desired voltage condition can be maintained with the regulator operating in whatever portion of its range is necessary in order to control the carbon pile for this purpose. A change in the voltage desired may be secured by adjustment of the bushing 33 which will result in a change in the location of the zones A, B and C, the relative location and extent of which will also be controlled through selection of the various constants such as the force of the springs and of the magnets, the lever arms, etc.

As a specific example, a carbon pile was used comprising 76 discs ⅜" in diameter which had a resistance varying from about 180 ohms at the point of maximum controllable resistance to a minimum of 1½ to 2 ohms in the lower portion of its range corresponding to a total displacement of approximately .025 inch. This required a compressive force of approximately 10 pounds and by increasing the compressive force of the permanent magnet so that it develops up to 15 to 20 pounds, the resistance range may be extended to approximately ½ ohm or below. The maximum applied pressure of the electromagnet, and similarly of the spring forces at the high resistance end of the range was of the order of 25 to 30 pounds.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A regulator of the character described comprising a carbon pile resistor compressible over a range of operation, resilient means having essentially a linear characteristic for applying force in one direction with respect to said pile, electromagnetic means having an armature for developing a tractive force thereon having essentially a non-linear characteristic, means connected with said armature for transmitting the force developed thereon with a progressively changing ratio and with a substantially linear characteristic in opposition to that of said resilient means over a portion of the range of operation, and additional resilient means effective in another portion of the range of operation for developing an additional force opposing said electromagnetic means.

2. A regulator of the character described comprising a carbon pile, electromagnetic means having an armature and adapted to develop a non-linear force characteristic with respect thereto, a lever carrying said armature, a variable fulcrum for said lever adapted to apply the force of said electromagnet in a variable manner and with a substantially linear characteristic in one direction with respect to said pile, resilient means operating continuously in a direction opposite to that of said electromagnetic means for opposing the action thereof with respect to said pile, and auxiliary resilient means operable as said armature approaches the pole pieces for developing an increased opposing force with respect thereto.

3. A regulator of the character described comprising a carbon pile, electromagnetic means having an armature and adapted to develop a substantially non-linear force thereon, a lever carrying said armature, a variable fulcrum for said lever adapted to apply the force of said electromagnet with a substantially linear characteristic in one direction with respect to said pile, resilient means operating continuously in a direction opposite to that of said electromagnetic means for opposing the action thereof with respect to said pile, auxiliary resilient means operable as said armature approaches the pole pieces for developing an increased opposing force with respect thereto, the force of said auxiliary resilient means being applied substantially in line with said fulcrum in one position thereof and to one side thereof in another position thereof.

4. A regulator of the character described which comprises a compressible carbon pile resistor, resilient means having essentially a linear characteristic for developing force in one direction with respect to said pile, electromagnetic means having a pole piece and an armature and adapted to develop thereon a force having essentially a non-linear characteristic, means for variably transmitting the force developed by said electromagnet and applying said force in opposition to that of said resilient means and with a characteristic substantially corresponding with that of said resilient means, said last mentioned means including lever means for transmitting both of said forces to said resistor, and auxiliary resilient means applied to said lever substantially in line with said fulcrum in one position and adapted to develop an increasing force opposing said electromagnetic force as said armature approaches said pole piece.

5. A regulator of the character described which comprises a carbon pile, means for applying pressure in one direction with respect to the pile, electromagnetic means for applying pressure in the opposite direction, variable means for transmitting and applying the resultant of said pressure forces to said pile, means for producing variation of said variable means to cause said forces as applied to said pile to be in substantial balance with each other providing a resultant force having a substantially linear characteristic corresponding with the substantially linear characteristic of said pile over the higher range of resistance thereof, and means operable as said pile is compressed into its low resistance range for applying thereto an additional force increasing in a non-linear manner to cause compression of said pile into its low resistance range.

6. A regulator of the character described which comprises a carbon pile, means for developing a pressure to cause compression of said pile, electromagnetic means for developing an opposing pressure, lever means for transmitting and applying the resultant of said pressures to said pile, means for producing variation of the effective moment arm of said lever means to cause said forces to be in substantial balance with each other, and magnetic means operable as said pile is compressed into its low resistance range for applying additional force thereto.

7. A regulator of the character described which comprises a carbon pile, resilient means for developing a pressure in one direction with respect to the pile, electromagnetic means for developing an opposing pressure, lever means for transmitting and applying the resultant of said pressure forces to said pile, means for producing variation of the effective moment arm of said lever means to cause said forces to be in substantial balance with each other, and magnetic means operable as said pile is compressed into its low resistance range for applying a non-linear and progressively increasing force thereto.

8. A regulator of the character described which comprises a carbon pile, means for causing compression of said carbon pile, electromagnetic means having an armature, a lever supporting said armature and adapted to apply the force of said electromagnet in opposition to that of said compression means leaving a resultant for effecting compression of said pile, a variable fulcrum for said lever to cause the force of said electromagnet applied by said lever to vary in corresponding relation with that of said compression means, and auxiliary magnetic means operable upon said lever in a predetermined portion of its range of movement for developing an additional force required to compress said resistor to its low resistance range.

9. A regulator of the character described which comprises a compressible carbon pile resistor, resilient means having essentially a linear characteristic for developing force in one direction with respect to said pile, electromagnetic means having essentially a non-linear characteristic, means for variably transmitting the force developed by said electromagnet and applying said force in opposition to that of said resilient means and substantially corresponding with said force, said last mentioned means including lever means for transmitting both of said forces to said resistor, means providing a variable fulcrum for said lever in its range of operative movement, auxiliary resilient means applied to said lever substantially in line with said fulcrum in one position and adapted to develop an opposing force to said electromagnetic force in other positions of said lever, and auxiliary magnetic means operable upon said lever in a predetermined portion of its range of movement for developing an additional force required to compress said resistor to its low resistance range.

10. A regulator of the character described comprising a carbon pile resistor, resilient means for applying force in one direction with respect to said pile, electromagnetic means for applying force in the opposite direction with respect thereto, said electromagnetic means including a pole piece and an armature in the form of a lever for transmitting the force of said electromagnetic means to said pile, and a pair of pole pieces, one of said pole pieces forming a variable fulcrum for said lever to cause the force transmitted thereby to vary progressively as said armature moves with respect to the other said pole piece.

THOMAS W. MOORE.